United States Patent
Sarti

(10) Patent No.: US 8,344,546 B2
(45) Date of Patent: Jan. 1, 2013

(54) POWER SUPPLY UNIT DIRECTLY CONNECTED TO BACKUP DIRECT CURRENT POWER SOURCE

(75) Inventor: Pierluigi Sarti, Milpitas, CA (US)

(73) Assignee: Facebook, Inc., Menlo Park, CA (US)

( * ) Notice: Subject to any disclaimer, the term of this patent is extended or adjusted under 35 U.S.C. 154(b) by 307 days.

(21) Appl. No.: 12/838,320

(22) Filed: Jul. 16, 2010

(65) Prior Publication Data

US 2012/0013186 A1 Jan. 19, 2012

(51) Int. Cl.
*H02J 7/00* (2006.01)
*H02J 9/00* (2006.01)

(52) U.S. Cl. .......................................... 307/64

(58) Field of Classification Search ............... 307/64, 307/65, 66
See application file for complete search history.

(56) References Cited

U.S. PATENT DOCUMENTS

| | | | |
|---|---|---|---|
| 5,432,386 A | 7/1995 | Cerra et al. | |
| 5,477,091 A | 12/1995 | Fiorina et al. | |
| 6,317,012 B1 | 11/2001 | Coffey | |
| 6,917,125 B2 | 7/2005 | Yim | |
| 7,462,954 B2 | 12/2008 | Kraus | |
| 7,653,827 B2 | 1/2010 | Dobbs et al. | |
| 7,870,379 B2 | 1/2011 | Krieger et al. | |
| 7,886,173 B2 | 2/2011 | Krieger et al. | |
| 2005/0099750 A1* | 5/2005 | Takahashi et al. | 361/92 |
| 2007/0278860 A1 | 12/2007 | Krieger et al. | |
| 2009/0021078 A1 | 1/2009 | Corhodzic et al. | |
| 2009/0164825 A1* | 6/2009 | Sartain | 713/340 |
| 2009/0189774 A1 | 7/2009 | Brundridge et al. | |
| 2010/0102633 A1 | 4/2010 | Seaton | |

OTHER PUBLICATIONS

PCT International Search Report and Written Opinion, PCT Application No. PCT/US2010/038516, Oct. 15, 2010, six pages.

* cited by examiner

*Primary Examiner* — Carlos Amaya
(74) *Attorney, Agent, or Firm* — Fenwick & West LLP

(57) ABSTRACT

A power supply unit that obviates the need for an uninterrupted power supply (UPS) for a server in a data center by receiving a DC power from a temporary backup power source. The power supply unit converts AC power received from a power utility service into a DC power for operating one or more motherboards of the server. An AC to DC converter in the power supply unit senses an input AC voltage and activates a DC to DC converter coupled to the temporary backup power source. The DC to DC converter powers the one or more motherboards until a generator serving as an auxiliary AC power source becomes operational. The power supply unit resumes connection to the AC to DC converter after the generator becomes operational.

19 Claims, 5 Drawing Sheets

POWER SUPPLY UNIT DIRECTLY CONNECTED TO BACKUP DIRECT CURRENT POWER SOURCE

CROSS-REFERENCE TO RELATED APPLICATION

This application is related to U.S. application Ser. No. 12/509,349, filed on Jun. 24, 2009, which is incorporated by reference herein in its entirety.

BACKGROUND

This invention relates generally to power electronics, and more particularly to a power supply unit for providing backup power to a server and/or to other critical electrical equipment.

Organizations often employ data centers to manage their data processing and other computing needs. A data center typically houses many racks of servers, which together perform the processing tasks that a single machine could not. The role of a data center is often critical to an organization, and downtime of a data center can result in severe consequences to the organization and to others who may rely on the data center. Since power failures are not uncommon, data centers use power backup systems to deal with interruptions in the supply of power from utility services that would otherwise result in downtime.

One power backup system designed to provide emergency power to computing resources is called an uninterrupted power supply (UPS). In a typically data center deployment, a UPS is placed between the input power terminal from a utility service and one or more power distribution units in the data center, to which the servers are connected. When the utility power is functioning properly, the UPS uses a portion of the utility power to charge a battery within the UPS, using an internal rectifier to convert the AC power from the utility service into DC power for charging the battery. The majority of the remaining power from the utility service is passed along for use by the site. If an interruption in the utility power occurs, the UPS provides temporary backup power to the site by using an inverter to convert the DC power stored in its battery into AC power. This temporary power is available for a short period of time, allowing an auxiliary power supply (such as a generator) to be turned on or allowing the equipment to be shut down safely, thereby avoiding catastrophic loss.

Because the power conversions performed by the rectifiers and inverters in the UPS are relatively inefficient, the UPS process can result in a power loss of up to 10-12%. For large data centers, this inefficiency can be very significant. Not only is this a waste of electrical power and the costs associated therewith, it also produces heat at the UPS and thus requires additional electrical power to remove the additional heat using an air conditioning system. It would be desirable, therefore, to eliminate the need for the UPS system altogether, while still providing backup power to critical electrical equipment.

One alternative to a UPS is to place a backup battery on each motherboard in a data center. Although the backup batteries can supply power in the event of a utility power failure, this design suffers from a number of drawbacks. For example, locating the batteries on the motherboard increases the cooling requirements for the server, since the batteries must be kept away from higher temperatures. The design also requires a large number of batteries, one for each server motherboard, which increases the maintenance costs and as well as the monitoring requirements to ensure that the backup power system is reliable. Finally, given the large number of batteries, failure of at least some of the batteries is more likely, but this design provides no redundancy in the case of battery failure.

SUMMARY

Embodiments of the invention obviate the need for an uninterrupted power supply (UPS) by providing a power supply unit that is directly connected to a backup power source to power one or more electrical components in a computing device when AC power from a primary AC power source (e.g., utility service) fails. The power supply unit powers receives input from the backup power source and powers the electrical components of the computing device for a period of time sufficient to allow an auxiliary AC power source (e.g., power generator) to be turned on in the event of a failure of power from the primary power source.

In one embodiment, the power supply unit includes an AC (alternating current) to DC (direct current) converter, a DC to DC converter and an output node. The AC to DC converter is configured to generate a first DC output voltage based on an AC input received from the primary power source or the auxiliary AC power source. A DC to DC converter is turned on when the AC input from the primary power source is interrupted. After the DC to DC converter is turned on, the DC to DC converter generates a second DC output voltage based on a DC input voltage received from a backup power source. The output node is coupled to the output of the AC to DC converter or the output of the DC to DC converter and provides power to the one or more electrical components.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
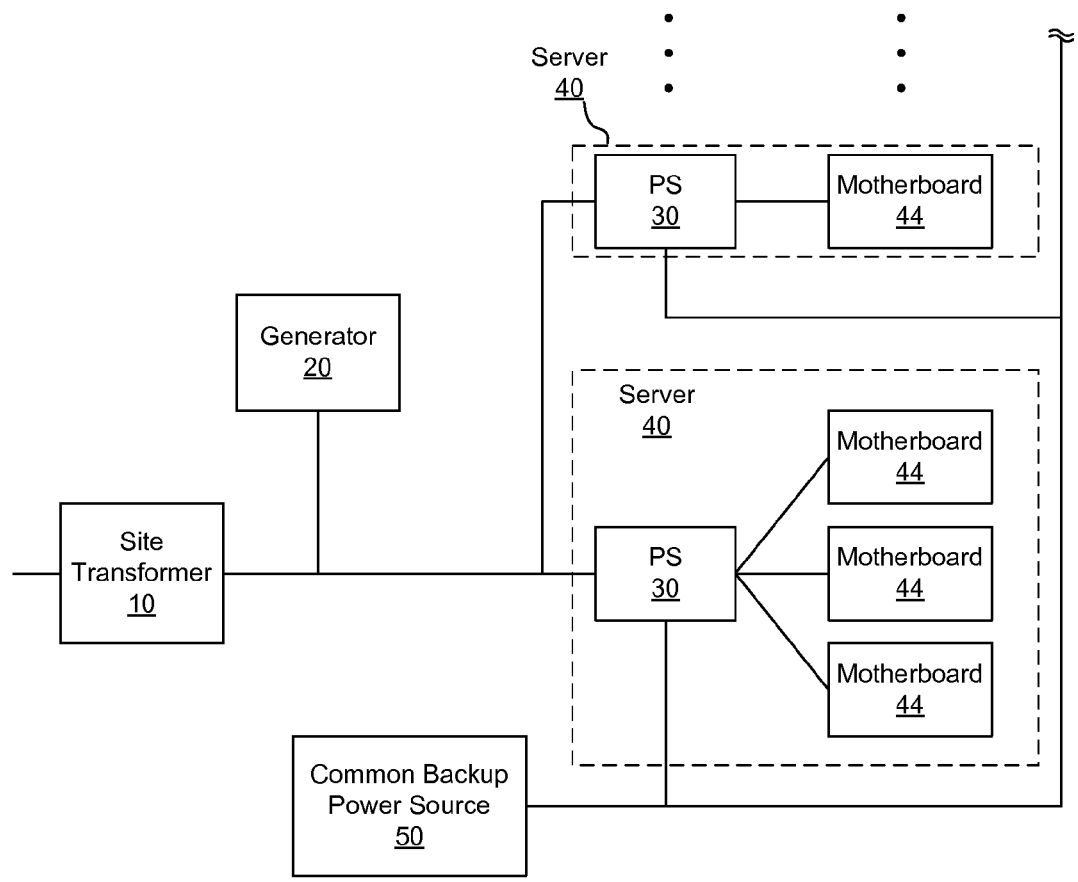
FIG. 1 is a schematic block diagram of a server system having a backup power source for a plurality of servers, in accordance with an embodiment of the invention.

FIG. 1 illustrates an example electrical system for providing power to a number of servers 40 located at a site, such as a data center. As used herein, a server 40 (or server computer) is any hardware computing device that is designed to provide computing services to clients, usually in conjunction with appropriate software installed on the server. Therefore, the techniques disclosed herein may be used to provide power to any kind of hardware devices that rely on electrical power from a power utility service and are thus subject to the dangers of occasional power outages.

A utility service often transports and delivers AC power at a higher voltage than that used at a customer premises. As a result, as shown in FIG. 1, a site transformer 10 receives AC power in the range of several kilovolts and steps the voltage down for use at the site. In one embodiment, the servers 40 in the premises are plugged directly into the secondary winding of the site transformer 10 that generates a voltage output of 480 VAC line-to-line or 277 VAC RMS. There is no separate power distribution unit between the site transformer 10 and the servers 40. Omitting separate power distribution units is advantageous, among other reasons, because: (i) the overall efficiency of the power system can be increased by removing any efficiency drop attributable to the power distribution units, (ii) overall power distribution scheme is simplified, (iii) cost associated with the power distribution units can be saved, and (iv) the efficiency loss in the conducting cables (e.g., copper wire) to the servers 40 can be lowered due to lower current in the cables.

In another embodiment, multiple servers 40 are plugged to one or more power distribution units that are in turn coupled to the secondary winding of the site transformer 10. The power distribution units reduce high voltage at the site transformer 10 to levels more commonly used (e.g., from 480 VAC to multiple plugs of 208 VAC and/or 120 VAC).

Since the power provided by the utility service may suffer from occasional interruptions, the system shown in FIG. 1 includes a backup power system. Instead of using a UPS, the system includes a generator 20 as an auxiliary AC power source and a mechanism for directly providing DC power to power supply units 30 of the servers 40. Upon failure of the electrical power from the utility service, the generator 20 is activated. However, a backup generator 20 requires some startup time before it can supply AC electrical power to the servers 40. Therefore, while the generator 20 is starting up, common backup power source 50 provides DC electrical power directly to the power supply units 30 of the servers 40.

Each power supply unit 30 may power one or more motherboards 44, and other peripheral devices connected to the one or more motherboards 44. The number of motherboards and peripheral devices powered by each power supply unit 30 depends on the capacity of the power supply unit 30 and the power consumption of the power consuming components. In one embodiment, each power supply unit 30 has output power rating of 450 W. Although the power supply units 30 are illustrated in FIG. 1 as being embodied within the servers 40, the power supply units 30 may be embodied as separate units external to the servers 40.

In one embodiment, the servers 40 are deployed in a rack-mounted system, where each of a plurality of racks contains a plurality of servers 40. The rack provides a mechanical interface for the servers 40, which are fixed in place by the rack. The rack also provides an electrical interface for the servers, including power lines and communication buses. The racks may also connect the multiple servers 40 to ground return of the common backup power source 50, which may cause potential ground-loops current or re-circulating ground current generated during DC backup operations. Hence, DC/DC converters in the power supply units 30 are isolated, as described below in detail.

In one embodiment, the rack includes a plug that is connected to an AC power source, such as a power distribution unit at the site. The plug is coupled to a conductor that runs along the rack, making electrical contact with a power supply unit of each installed server and thereby providing AC electrical power to the power supply units 30.

The rack also includes an electrical conductor for providing DC electrical power from the common backup power source 50 to the power supply units 30 in the servers 40. The common backup power source 50 may be connected to any number of racks, and multiple backup power sources 50 may be coupled to the same rack. In one embodiment, the multiple backup power sources 50 are co-located with the power supplies 30 to reduce the length of the conducting cables between the power supplies 30 and the power sources 50. The reduction in the length of the wires beneficially reduces impedance, resulting in a smaller voltage drop during the start of the DC backup operation. In another embodiment, one or more backup power sources 50 are located at a location remote from the power sources 50 and shared by multiple servers 40.

Figure 2:
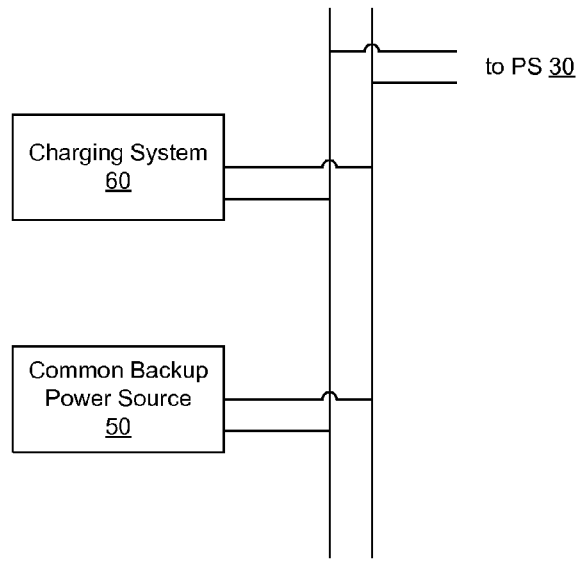
FIG. 2 is a schematic block diagram of a common backup power source, in accordance with an embodiment of the invention.

FIG. 2 illustrates the backup power source 50 and charging system 60, according to one embodiment. The backup power source 50 may provide a higher DC voltage than the voltage used by the servers 40 (e.g., 12 VDC, 5 VDC, and/or 3.3 VDC). The charging system 60 charges the common backup power source 50 while the AC input is available from the transformer 10. In one embodiment, a higher voltage is transmitted in a cable to the power supply units 30 of the servers 40 and then converted down at the power supply units 30 to the appropriate voltage levels required by one or more motherboards or other peripheral devices of the servers 40. As described below in detail, the power supply units 30 may include isolated DC/DC converters to prevent parasitic current or potential ground loop from affecting DC backup power operation.

Figure 3A:
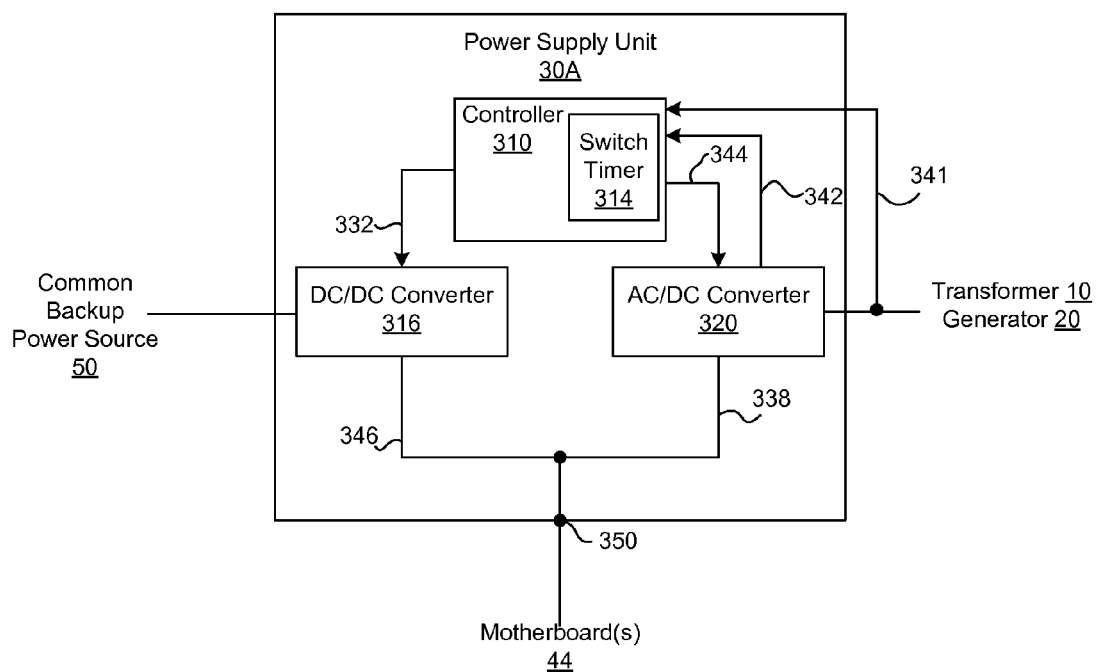
FIG. 3A is a block diagram of a power supply unit, in accordance with an embodiment of the invention.

FIG. 3A illustrates a power supply unit 30A, according to one embodiment of the present invention. The power supply unit 30A may include, among other components, a controller 310, an isolated DC/DC converter 316, an AC/DC converter 320 and an output node 350. A path from the output of the DC/DC converter 316 and a path from the AC/DC converter 320 are connected to the output node 350. The power supply unit 30A may include other components not illustrated in FIG. 3 such as an over temperature (OT) protection circuit and a cooling fan. Moreover, one or more components illustrated in FIG. 3 may be combined into a single module. The power supply unit 30A may be a unitary structured apparatus enclosing at least a portion of components in a housing.

The AC/DC converter 320 provides power to the motherboard 44 and its peripheral devices either (i) during normal operation times when a utility service is providing AC power to the site or (ii) during a backup power operation when the AC input 341 from the utility service is interrupted and the generator 20 is operational to resume the AC input 341. The AC/DC converter 320 is connected to receive AC input 341 from the site transformer 10 or the generator 20. The AC/DC converter 320 generates a regulated DC output voltage 338 at its output when the AC input 341 is available. The DC/DC converter 316 also generates a regulated voltage 346 at its output during backup DC operation when AC input 341 is unavailable.

Figure 3B:
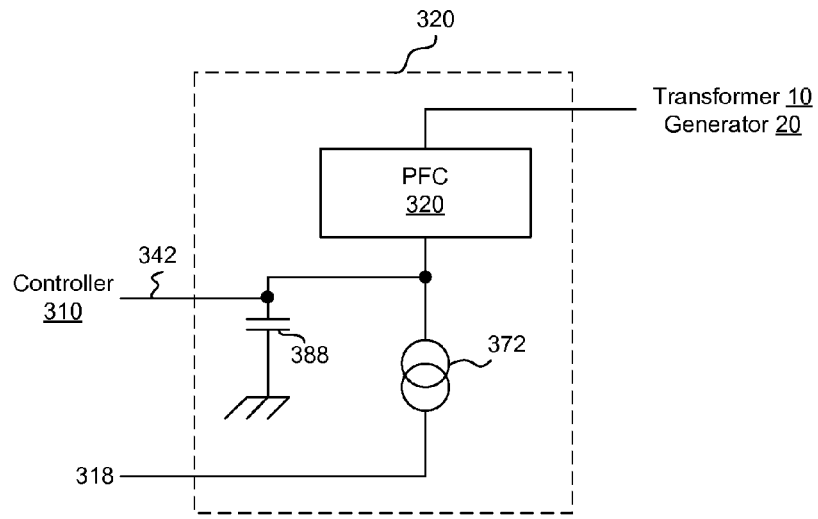
FIG. 3B is a block diagram of the AC/DC converter of the power supply unit, in accordance with an embodiment of the invention.

FIG. 3B is a block diagram illustrating the AC/DC converter 320, according to an embodiment. The AC/DC converter 320 may include, among other components, a power factor correction unit 320, a bulk capacitor 388 and a transformer 372. The power factor correction unit 320 performs power factor correction to improve power factor, using any methods and techniques well known in the art. The bulk capacitor 388 provides current to the output node 350 for a hold-up time before the output voltage 338 drops to a level insufficient to sustain the operation of the one or more motherboards 44. With sufficient hold-up time, the DC/DC converter 316 may be turned on in time and provide power to the motherboards 44 before the AC/DC converter 320 is completely shut down. The minimum hold-up time of the AC/DC converter 320, for example, is 20 milliseconds. The transformer 372 operates to lower the voltage of the output 338 relative to the voltage input 341 from the transformer 10 or the generator 20.

In one embodiment, the AC/DC converter 320 gradually reduces a current output while the DC/DC converter 316 is gradually ramped up during a transition time (e.g., 10 milliseconds). During the transition time, both the AC/DC converter 320 and the DC/DC converter 316 provide current to the output node 350. If the DC/DC converter 316 abruptly generates a large output current, the DC voltage output from the common backup power source 50 may suddenly drop due to the impedance in the cables between the backup power source 50 and the power supply units 30A and the impedance in the common backup power source. The voltage drop may be significant, for example, when the common backup power source 50 is located remotely from the power supply units 30A and the cables extend for a long distance. The drop in the output of the DC/DC converter 316 may cause interruption of DC power during the outage of the AC input when the DC power is needed. To prevent or reduce the voltage drop, the controller 310 may include various analog or digital circuits so that the current from the DC/DC converter 316 is gradually increased and the current from the AC/DC converter 320 is gradually decreased during the transition time. When the AC input 341 resumes (either from the transformer 10 or the generator 20), the DC/DC converter 316 may gradually reduce its current output while the AC/DC converter 320 gradually increases its current output.

The DC/DC converter 316 temporarily powers the motherboards 44 and their peripheral devices between the time at which the AC input 341 from the utility company is interrupted and the time at which the AC input 341 is resumed by the generator 20. The DC/DC converter 316 is connected to the common backup power source 50 to receive a DC input voltage. The DC/DC converter 316 steps down the DC input voltage (e.g., 48 VDC) to a lower voltage (e.g., 12.2 VDC) for operating the motherboards 44.

In one embodiment, voltage 342 across the bulk capacitor 388 is monitored by the controller 310. If the load at the motherboards 44 is relatively low, the bulk capacitor 388 provides output 338 to the motherboards 44 without transitioning to DC/DC converter 316 for a predetermined amount of time. The predetermined amount of time may be fixed or vary as a function of the voltage across the bulk capacitor 388 represented as voltage 342. In one embodiment, the DC backup operation is initiated at the power supply 30A if the AC input is not detected for a timeout period (e.g., 100 milliseconds) regardless of the load or the voltage across the bulk capacitor 388. If the predetermined amount of time elapses, the controller 310 sends control signals 332 and 344 to the DC/DC converter 316 and the AC/DC converter 320, respectively, to control the DC backup operation. Conversely, if the load at the motherboards 44 is relatively high, the DC backup operation may start immediately.

Referring back to FIG. 3A, the input of the DC/DC converter 316 and the output 350 of the power supply unit 30A may be electrically isolated. The electrical isolation is advantageous, among other reasons, because the isolation prevents propagation of common mode noise and buildup of ground loop that may negatively affect the operation of the power converter 30A and other components of the server 40.

In one embodiment, the DC/DC converter 316 is turned off until activated by the controller 310. By turning off the DC/DC converter 316 while the AC input is active, power loss in the DC/DC converter 316 may be minimized.

In one embodiment, the common backup power source 50 provides a lower voltage level (e.g., 12 VDC) for operating the motherboards 44. In this embodiment, the DC/DC converter 316 may be omitted and a DC voltage regulator may be used in place of the DC/DC converter 316. The DC voltage regulator electrically isolates the output node 350 of the power supply unit 30A and the common backup power source 50.

In one embodiment, the controller 310 produces the control signal 332 to turn on the DC/DC converter 316 in response to the voltage 342 across the bulk capacitor 388 and the input AC voltage 341 from the transformer 10 or the generator 20. The controller 310 sends the control signal 332 causing the output of the DC/DC converter 316 to provide current to the output node 350 of the power supply unit 30A if the AC input 341 is interrupted. The controller 310 also sends the control signal 344 to resume connection between the output node 350 and the output of the AC/DC converter 320 when the AC input 341 is resumed.

The controller 310 also receives the AC input 341 (or a scaled-down version thereof) to determine if the AC input 341 is interrupted or active. Various methods and sensing techniques may be employed to monitor the voltage level of the AC input 341 in real time. In one embodiment, the methods and sensing techniques operate over an entire range of the sinusoidal waveform (from 0 degrees to 360 degrees) of the AC input 341. The controller 310 may start a backup power operation if an instant value or average value of the AC input voltage 341 drops below a threshold level.

In one embodiment, the controller 310 continues to connect the DC/DC converter 316 to the output node 350 of the power supply unit 30A for a predetermined amount of time after the AC input 341 is restored. For example, the DC/DC converter 316 is coupled to the output node 350 of the power supply for a few seconds. After the predetermined amount of time expires, the controller 310 may connect the output of the AC/DC converter 320 to the output node 350 of the power converter. By continuing the connection of the output node 350 to the DC/DC converter 316 for a predetermined amount of time, frequent toggling between the AC power source and the DC power source during unstable supply of AC power may be prevented.

In one embodiment, the controller 310 includes a switch timer 314 to coordinate timing for switching from the common backup power source 50 to the generator 20. The generator 20 may experience a sudden surge of power output when a large number of servers 40 simultaneously switch from the common backup power source 50. Such sudden surge of power demand may temporarily overload the generator 20 and interrupt prompt startup of the generator 20, which may cause interruption of power to the servers 40. To prevent such temporary overload, the switch timer 314 determines a delay time for switching from the common backup power source 50 to the generator 20.

The delay time for switching may be randomized for each power supply unit 30A. For example, the switch timer 314 generates a random number N between 0 and 5000. The controller 310 sends the control signal 348 to switch from the DC/DC converter 316 to the AC/DC converter 320 when N milliseconds have passed after resuming of the AC input voltage. In this example, all of the power supply units 30A switch to receive power from the generator 20 within 5 seconds after the AC voltage is resumed at a random time from 0 milliseconds to 5000 milliseconds. When AC/DC converters 320 are turned on randomly, the DC/DC converters 316 are kept on to share the current with the AC/DC converters 320 for a few hundred milliseconds to enable a smooth ramp up of current from AC input current. In one embodiment, the randomize switching does not occur when the AC voltage is resumed within a predetermined amount of time (e.g., 6 seconds). If the AC voltage resumed within the predetermined time, the AC input is likely to have resumed from the utility company instead of the generator 20 because the generator 20 generally takes time to start and provide the AC voltage. The power from the utility company is sufficient to withstand abrupt surge in current for ll of the power supplies 30, and hence, randomly delayed switching is not required when the power from the utility company resumes.

The output node 350 is an interface between the motherboards 44 and the power supply unit 30. The DC output of the power supply unit 30A is provided to the motherboards 44 via the output node 350. The output node 350 may be embodied as a board-to-board connector to the motherboards 44 to increase the overall efficiency, reduce costs and improve system airflow.

Figure 3C:
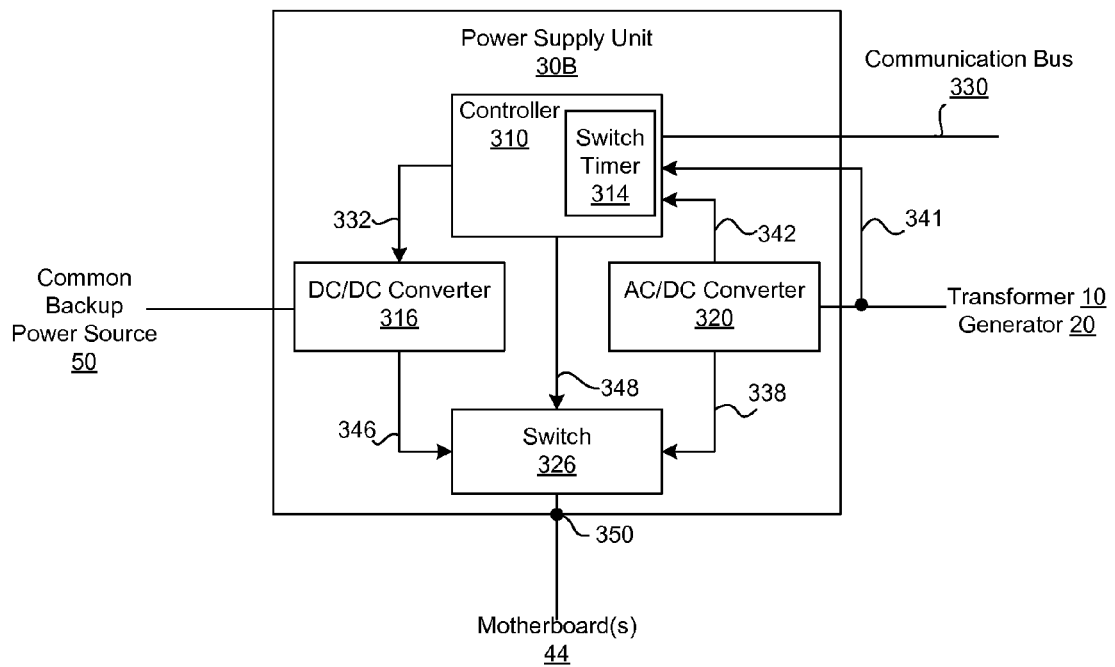
FIG. 3C is a block diagram of a power supply unit, in accordance with another embodiment of the invention.

FIG. 3C is a block diagram of the power supply unit 30B according to another embodiment of the present invention. The embodiment of FIG. 3C is essentially the same as the embodiment of FIG. 3A except that the power supply unit 30B includes a communication bus 330 and a switch 326. The controller 310 is connected to a communication bus 330 to send data associated with the operation of the power supply unit 30B. The controller 310 may transmit data, including among others, time the backup power operation is invoked and diagnostics of the power supply unit 30B. The data from the controller 310 may facilitate a human operator to replace, diagnose or troubleshoot the power supply unit 30B.

The switch 326 receives a control signal 348 from the controller 310 and connects the output node 350 of the power supply unit 30B to the output of the DC/DC converter 316 or the output of the AC/DC converter 320. In one embodiment, the switch 326 includes one or more active components (e.g., transistors) that respond to the control signal 348.

Figure 4:
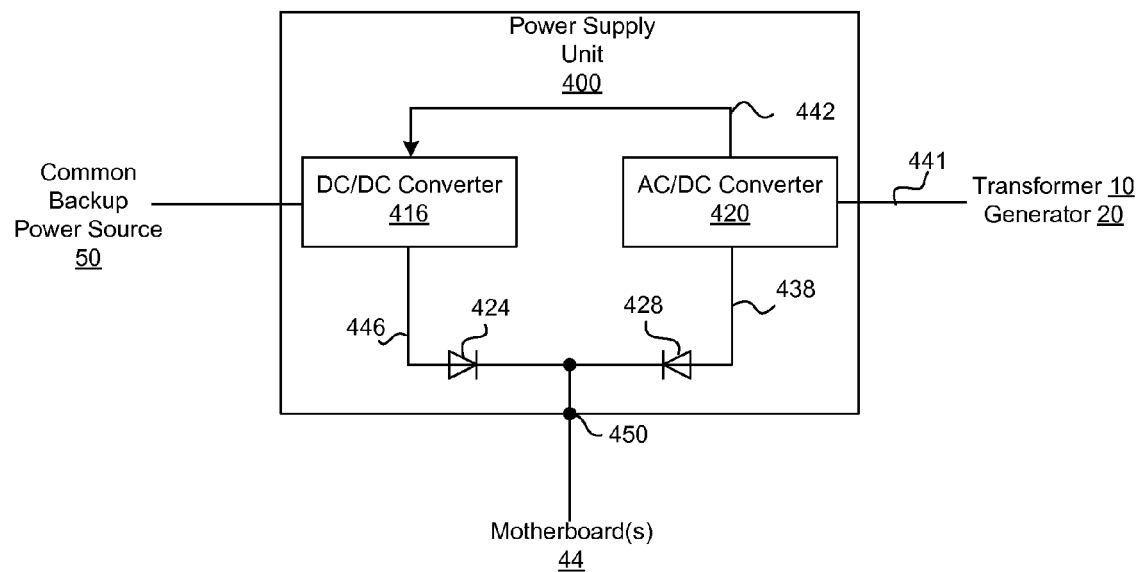
FIG. 4 is a block diagram of a power supply unit, in accordance with another embodiment of the invention.

FIG. 4 is a block diagram of a power supply unit 400, in accordance with another embodiment of the present invention. The power supply unit 400 is similar to the power supply unit 30A of FIG. 3A except that (i) the power supply unit 400 lacks a separate controller, (ii) the AC/DC converter 420 sends a voltage sense signal 442 to the DC/DC converter 416 directly to activate the DC/DC converter 416, and (iii) OR-ing diodes 424 and 428 are used in place of the switch 326.

The voltage sense signal 442 indicates whether the AC input 441 is interrupted or available. When the voltage sense signal 442 indicates that the AC input 441 is interrupted, the DC/DC converter 416 is turned on to start the backup power operation.

The DC/DC converter 416 and the AC/DC converter 420 of FIG. 4 function and operate in a manner similar to the DC/DC converter 316 and the AC/DC converter 320 of FIG. 3 except that the DC/DC converter 416 receives the voltage sense signal 442 directly from the AC/DC converter 420. Hence, the detailed description of the DC/DC converter 416 and the AC/DC converter 420 is omitted herein for the sake of brevity.

The diodes 424, 428 function as OR-ing diodes that provide the output node 450 of the power supply 400 with current from the output of the DC/DC converter 416 or the output of the AC/DC converter 420 but restrict reverse current from the output node 450 to the DC/DC converter 416 or the AC/DC converter 420. Specifically, the diode 424 conducts current from the DC/DC converter 416 to the output node 450 when the DC output 446 is active but restricts reverse current from the output node 450 to the DC/DC converter 416 when the AC/DC converter 420 is producing the DC output 438. Similarly, the diode 428 conducts current from AC/DC converter 420 to the output node 450 when the AC/DC converter 420 is producing the DC output 438 but restricts reverse current from the output node 450 to the AC/DC converter 420 when the AC/DC converter 420 is producing low or no DC output 438.

In one embodiment, the voltage of the DC output 438 from the AC/DC converter 420 is slightly higher than the DC output 446 from the DC/DC converter 416. Hence, when the AC input is restored and the voltage of the DC output 438 is gradually ramped up, the DC output 438 gradually replaces the DC output 446 to power the motherboards 44. After the voltage of the DC output 438 becomes higher than the voltage of the DC output 446, the DC/DC converter 416 no longer provides current to the output node 450, and hence, the DC/DC converter 416 may be shut off or placed in a sleep mode to reduce energy consumption at the DC/DC converter 416.

The power supply 400 advantageously has a simpler structure compared to the power supply unit of FIG. 3B. The diodes 424 and 428, however, may result in decreased power efficiency in the power supply unit 400 compared to the power supply units of FIG. 3B that uses the switch 326 with active electrical components. In one embodiment, the diodes may be replaced with active components (e.g., transistors) to reduce loss of efficiency.

In one embodiment, the DC/DC converter 416 remains in a stand-by mode where the DC/DC converter 416 produces an output voltage lower than the output voltage of the AC/DC converter 420 even when the AC input 441 is available. In this embodiment, the AC/DC converter 420 need not provide the voltage sense signal 442 to the DC/DC converter 416. The output 446 of the DC/DC converter 416, for example, has voltage that is 2.5% lower than the voltage at the output 438 of the AC/DC converter 426. When the interruption of AC input 441 causes the AC/DC converter 420 to stop generating the output 438, the DC/DC converter 416 automatically provides current to the output node 450.

Figure 5:
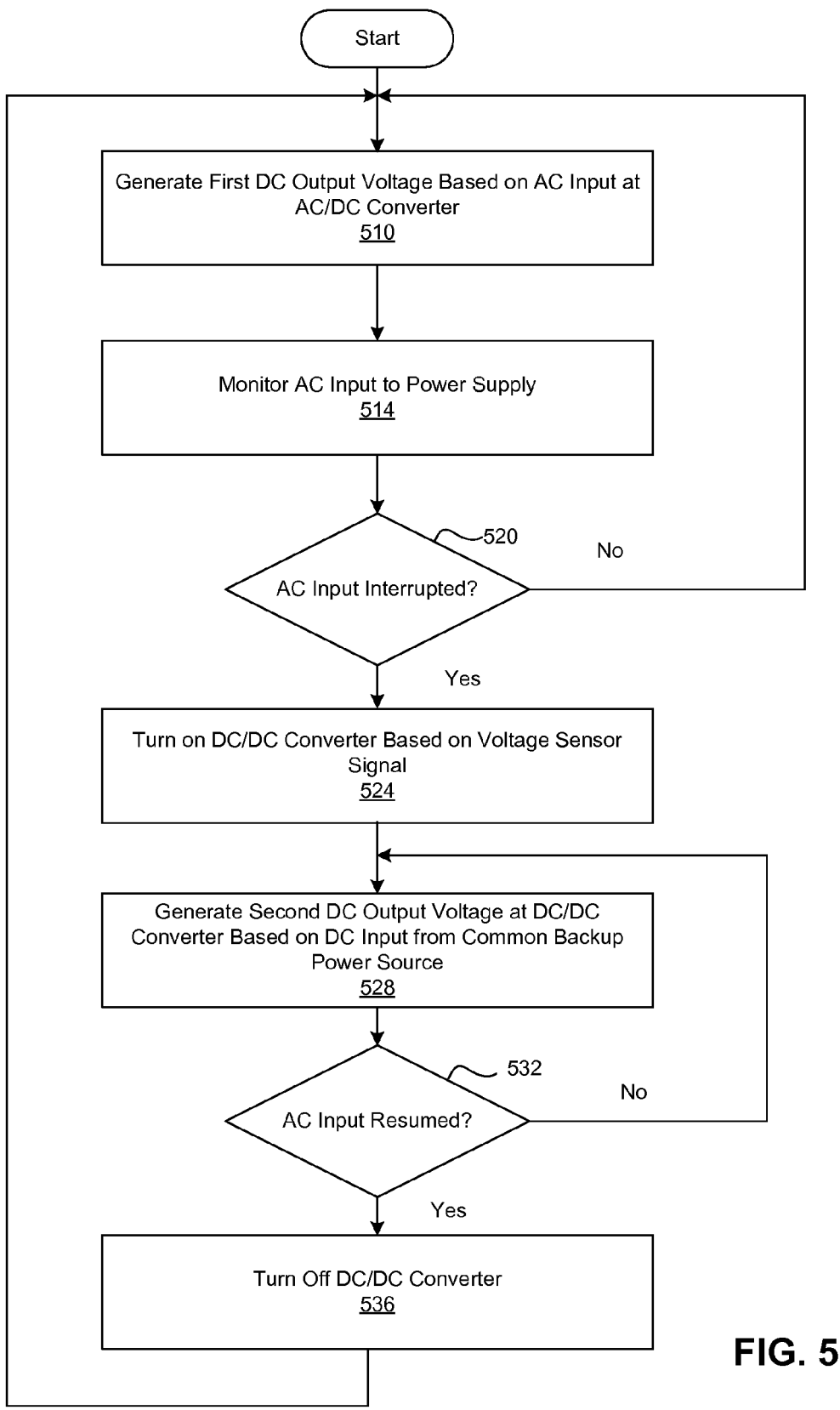
FIG. 5 is a flowchart for a method of supplying power to a server, in accordance with an embodiment of the invention.

FIG. 5 is a flowchart for a method of supplying power to a server, in accordance with an embodiment of the invention. In one embodiment, the AC/DC converter 320, 420 generates 510 a first DC output voltage based on the AC input 341, 441 received from the site transformer 10. In one embodiment, the AC/DC converter 320 monitors 514 the voltage level of the AC input 341, 441 to determine if the AC input is interrupted.

The controller 310 or the DC/DC converter 416 determines 520 whether the AC input 341, 441 is interrupted. If the voltage sensor signal indicates that the AC input 341, 441 is interrupted, the DC/DC converter 316, 416 is turned on 524. The DC/DC converter 316, 416 generates 528 a second DC output voltage based on the DC input received from the common backup power source 50.

Conversely, if the voltage sensor signal indicates that the AC input 341, 441 is not interrupted, the process returns to generating 510 the first DC output voltage and monitoring 514 the AC input 341, 441.

The controller 310 or the DC/DC converter 416 determines 532 whether the AC input 341, 441 has resumed. If the AC input 341, 441 has not resumed, the process returns to generating 528 the second DC output voltage.

Conversely, if the AC input 341, 441 has resumed, the DC/DC converter 316, 416 is turned off 536. Then the process returns to generating 510 the first DC output voltage and repeats the subsequent processes.

Various modifications may be made to the process illustrated in FIG. 5. For example, generating 510 of the first DC output voltage may be performed in parallel with monitoring 514 of the AC input 341, 441. Further, the DC/DC converter 316, 416 may remain turned on while the process returns to generating 510 the first DC output voltage and repeats the subsequent processes.

Although above examples were described primarily with reference to powering servers, the power supply unit according to embodiments of the present invention may be used to power other equipments in the site.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A power supply apparatus comprising:
   an AC to DC converter configured to generate a first DC output voltage at an output of the AC to DC converter responsive to receiving an AC input from a primary AC power source or an auxiliary AC power source;
   a DC to DC converter configured to receive a DC input voltage from a DC backup power source and generate a second DC output voltage responsive to turning on of the DC to DC converter;
   a controller configured to monitor the AC input, and control at least one of the AC to DC converter and the DC to DC converter, wherein the controller is configured to:
   determine energy stored in a capacitor of the AC to DC converter, and
   turn on the DC to DC converter based on the energy determined to be stored in the capacitor or a rate of change in the energy determined to be stored in the capacitor; and
   an output node coupled to the output of the AC to DC converter or the output of the DC to DC converter, the output node configured to connect to one or more components of the computing device.

2. The power supply apparatus of claim 1, wherein an input node of the DC to DC converter and the output node are electrically isolated.

3. The power supply apparatus of claim 1, wherein the voltage of the AC input is 277 VAC RMS (Root Mean Square) received directly from a site transformer.

4. The power supply apparatus of claim 1, wherein the controller maintains the DC to DC converter turned on for at least a predetermined amount of time before turning off the DC to DC converter.

5. The power supply apparatus of claim 1, wherein the controller comprises a switch timer for determining a time delay for turning off the DC to DC converter after the AC input is resumed.

6. The power supply apparatus of claim 1, wherein the time delay has a random value.

7. The power supply apparatus of claim 1, wherein the controller is configured to:
   turn off the DC to DC converter with a random time delay responsive to the AC input resuming after a predetermined amount of time; and
   turn off the DC to DC converter without the random time delay responsive to the AC input resuming within the predetermined amount of time.

8. The power supply apparatus of claim 1, wherein the controller is coupled to a communication bus for sending data associated with operations of the DC to DC converter.

9. The power supply apparatus of claim 1, wherein the controller determines the energy stored in the capacitor by monitoring voltage across the capacitor.

10. The power supply apparatus of claim 1, wherein an output current from the AC to DC converter is decreased and an output current from the DC to DC converter is increased for a predetermined amount of time after the AC input is interrupted.

11. The power supply apparatus of claim 1, wherein the DC input voltage is received from a common DC power source shared by one or more other power supply apparatuses.

12. The power supply apparatus of claim 1, further comprising:
   a first diode coupled between the output of the DC to DC converter and the output node, the first diode preventing current from the output node to the DC to DC converter; and
   a second diode coupled between the output of the AC to DC converter and the output node, the second diode preventing current from the output node to the output node of the AC to DC converter.

13. The power supply apparatus of claim 12, wherein the first DC output voltage is higher than the second DC output voltage.

14. A method for supplying power to a computing device by a power supply apparatus, the method comprising:
   receiving AC input from a primary power source or an auxiliary AC power source;
   generating a first DC output voltage at an AC to DC converter;
   coupling an output node to the AC to DC converter to power components of a computing device;
   determine energy stored in a capacitor of the AC to DC converter, and turning on a DC to DC converter coupled to a DC backup power source based on the energy determined to be stored in the capacitor or a rate of change in the energy determined to be stored in the capacitor;
   generating a second DC output voltage at the DC to DC converter responsive to turning on the DC to DC converter;
   coupling the output node to the DC to DC converter to power the components of the computing device; and turning off the DC to DC converter responsive to resuming of the AC input.

15. The method of claim 14, wherein an input node of the DC to DC converter and the output node are electrically isolated.

16. The method of claim 14, wherein the voltage of the AC input is 277 VAC RMS (Root Mean Square) received directly from a site transformer.

17. The method of claim 14, further comprising:
monitoring the AC input at a controller; and
controlling, by the controller, at least one of the AC to DC converter and the DC to DC responsive to the interruption in the AC input.

18. A computing system comprising a power supply apparatus, comprising:
 a motherboard; and
 the power supply apparatus connected to the motherboard to power the motherboard, the power supply apparatus comprising:
  an AC to DC converter configured to generate a first DC output voltage at an output of the AC to DC converter responsive to receiving an AC input from a primary AC power source or an auxiliary AC power source;
  a DC to DC converter configured to receive a DC input voltage from a DC backup power source and generate a second DC output voltage responsive to turning on of the DC to DC converter;
  a controller configured to monitor the AC input, and control at least one of the AC to DC converter and the DC to DC converter, wherein the controller is configured to:
   determine energy stored in a capacitor of the AC to DC converter, and
   turn on the DC to DC converter based on the energy determined to be stored in the capacitor or a rate of change in the energy determined to be stored in the capacitor; and
  an output node coupled to the output of the AC to DC converter or the output of the DC to DC converter, the output node configured to couple to the motherboard.

19. The computing system of claim 18, wherein the voltage of the AC input is 277 VAC RMS (Root Mean Square) received directly from a site transformer.

* * * * *